Aug. 21, 1928.
L. E. BEOUGHER
1,681,633
AUTOMOBILE JACK
Filed May 10, 1927
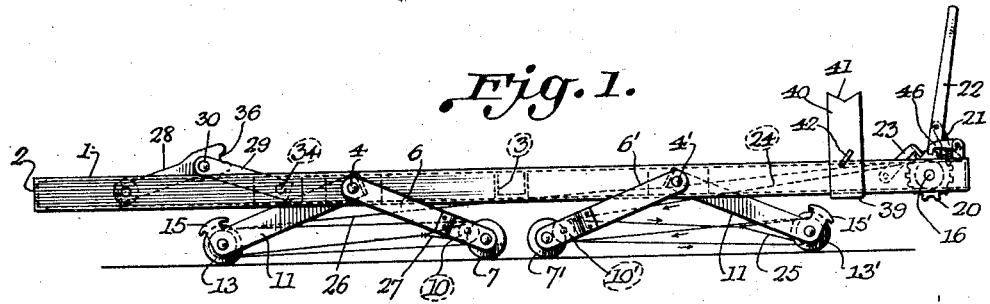
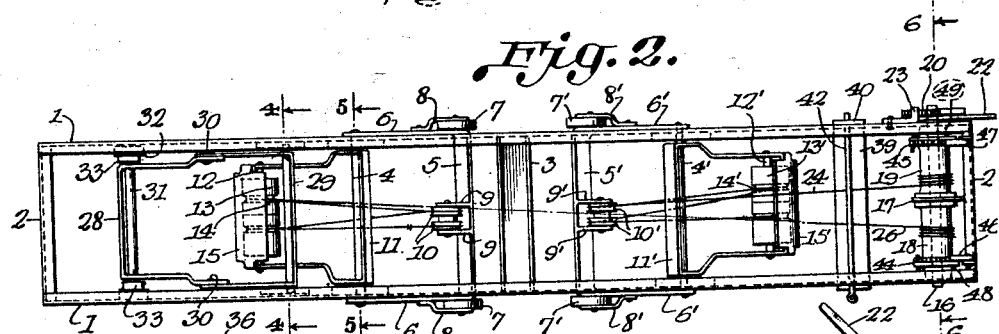
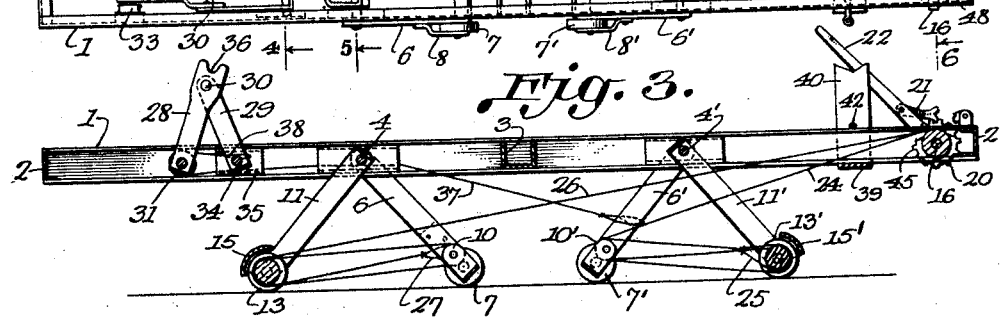
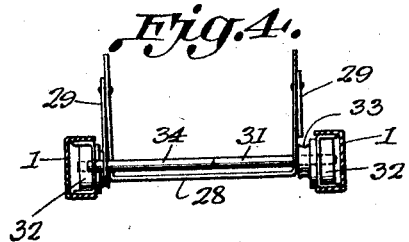
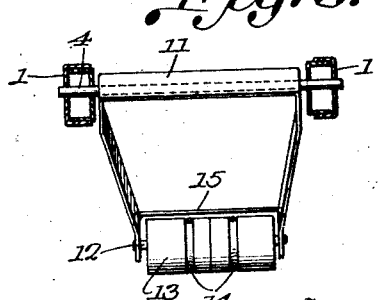
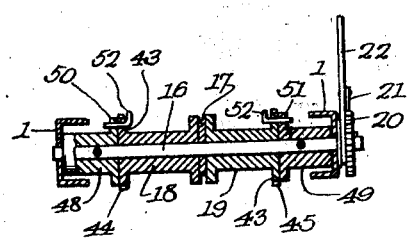
Inventor
Lawrence E. Beougher
By Baldwin & Wight
Attorney Patented Aug. 21, 1928.

1,681,633

UNITED STATES PATENT OFFICE.

LAWRENCE E. BEOUGHER, OF LYNWOOD, CALIFORNIA.

AUTOMOBILE JACK.

Application filed May 10, 1927. Serial No. 190,283.

This invention relates to an automobile jack in the form of a frame which may be inserted under the body of the machine and operated from one end thereof to raise either or both ends of the automobile off of the ground and at the same time to lift the automobile above the body of the jack.

The various features of the invention will be apparent from the following detailed description and the appended claims.

In the drawings:

Figure 1 is a side elevation of the jack in lowered position.

Figure 2 is a bottom plan view of the same.

Figure 3 is a longitudinal section with the jack in raised position.

Figure 4 is a transverse section on the line 4—4 of Figure 2.

Figure 5 is a transverse section on the line 5—5 of Figure 2.

Figure 6 is a section on the line 6—6 of Figure 2.

The jack herein disclosed comprises a rectangular body member having sides 1, end pieces 2, and an intermediate cross bar 3, all of which parts are preferably made of channel shaped metal members. Mounted transversely in the frame are two rods 4, 4' and U-shaped members 5, 5' have their arms 6, 6' pivoted on said rods outside the frame members 1. Near the cross bar these arms have mounted thereon wheels 7, 7' which are held in position by keepers 8, 8'. Intermediate the ends of the U-shaped members or cross bars 5, 5' are lugs 9, 9' carrying thereon spindles upon which are mounted pairs of pulleys 10, 10'.

Similar U-shaped members 11, 11' have their arms mounted to turn on the rods 4, 4', but lie inside of the frame members 1 and extend in a direction opposite to the sides 6, 6' of the other U-shaped members. In the free ends of the arms of the U-shaped members 11, 11' are mounted spindles 12, 12' upon which are mounted rollers 13, 13' each of which has a groove 14, 14' serving as a pulley. A guard member 15, 15' partially encloses these rollers.

At one end of the frame is mounted a transverse shaft 16 which has its bearings in the side members 1 and intermediate its ends in an arm 17 extending inwardly from the end member 2. Mounted on this shaft are drums 18 and 19 and the outer end of the shaft is provided with a ratchet wheel 20 which may be engaged by an operating pawl 21 carried by a lever 22 mounted on the end of the shaft 16 to turn about the axis thereof. A holding pawl 23 is also provided which may be thrown out of engagement whenever desired.

A cable 24 is attached at one end to the drum 19 and extends around one of the pulleys 10', thence to and around one of the rollers 13' lying in the groove 14', back to and around the other roller 10' and again back to the other roller 13' where it is provided with a loop 25 by means of which it is fastened to this roller, the loop engaging in the groove 14'. It is obvious that if the parts are in the position shown in Figure 1 and the handle 22 is operated to turn the drum 19 and wind up the cable 24, the two U-shaped members will be caused to approach each other as indicated in Figure 3, the rollers 7' and 13' running on the ground and this action will result in lifting the frame of the jack and consequently the automobile off of the ground.

Similarly a cable 26 runs from the drum 18 back to the other roller 13, around this, to and around the pulley 10, around the other roller 13, and back to the other pulley 10 to which it is attached by means of a loop 27. A pull on the cable 26 will move this portion of the jack member from the position shown in Figure 1 to that of Figure 3.

Another toggle member is formed by means of a U-shaped member 28 and a second U-shaped member 29 which are pivoted together at 30 at their free ends. The U-shaped member 28 is carried by a shaft 31 provided at its ends with rollers 32 which run in the channels on the side frame members 1. Just inside these rollers the shaft is provided with pulleys 33. The U-shaped member 29 is provided with a shaft 34 which at its ends fits in blocks 35 which slide in and are guided by the channel members 1. Cables 37 are attached at their ends to the arms 6' and extend to and around the pulleys 33 and thence to the shaft 34 to which they are fastened as indicated at 38. It is obvious that when the arms 6' are moved from the position shown in Figure 1 to that of Figure 3 a pull will be exerted on the cable 37 which will bring the toggle formed by the members 28 and 29 into the Figure 3 position.

The upper ends of the arms of the U-shaped member 28 are provided with notches 36 which are adapted to engage under the axle or other appropriate parts of the machine. It is obvious, therefore, that the automobile will not only be lifted off of the ground by the upward movement of the body of the jack but that the automobile will receive a further upward movement relative to the body of the jack. It is obvious that this toggle mechanism may be duplicated at the other end of the frame.

For convenience of illustration, however, there has been shown an alternative construction which comprises a U-shaped member having a base 39 and arms 40 provided with notched ends 41 and a removable rod 42 is adapted to pass through said arms and hold this device on the frame of the jack when so desired. In the use of this modification, the U-shaped member is removed from the jack which is operated to lift the automibile in the usual way. The U-shaped member is then placed under the machine with the notched ends 41 underlying the axle housing and the jack is lowered until the sides thereof come in contact with the base 39 of this U-shaped member. The rod 42 is then placed in the position shown in the figures and the jack again operated, which will result in lifting the automobile still higher from the ground and will provide a space between the frame and the jack and the underside of the automobile.

Means is also preferably provided whereby either end of the jack may be raised independently of the other or both ends may be operated simultaneously. To accomplish this result, the drums 18 and 19 are loose on the shaft 16 and each drum has a flange 43. These flanges are provided with ratchet wheels 44 and 45 with which engage holding pawls 46 and 47 respectively which may be thrown into and out of position as desired. Fast on the shaft 16 are hubs 48 and 49 which have flanges 50 and 51 adjacent the flanges 43 of the drums. A suitable number of openings are provided in the flanges of the drums and hubs and when it is desired to clutch one of the drums to the shaft 16, a pin 52 is inserted in two registering openings of the desired drum and its associated hub. If only one drum is clutched to the shaft 16 obviously a rotation of the shaft will lift one end only of the jack and the corresponding end of the automobile.

The rollers 7, 7', 13 and 13' not only permit easy movement of the parts from the Figure 1 to the Figure 3 position but act as wheels by which the jack may be moved from place to place. The ratchet wheel 20 is or may be in the form of a cog wheel and the pawl 21 may be swung to either of two positions so that the jack may be lowered easily and steadily as desired.

While illustrated in connection with an automobile, it is obvious that the jack may be used to lift other objects, and the reference in the claims to automobiles is not to be regarded as limiting the same in this respect. It is obvious that many detail changes may be made in the precise construction of the device without in any way departing from the spirit of the invention, which is to be regarded as limited only by the scope of the appended claims.

I claim as my invention:

1. An automobile jack comprising a main frame mounted on wheels and adapted to be positioned under the automobile, and means for alternatively raising either end or both ends of said frame and the automobile by moving said wheels toward each other, as desired.

2. An automobile jack comprising a main frame adapted to be positioned under the automobile, means for raising the frame and automobile, and means for raising the automobile relative to the frame.

3. An automobile jack comprising a main frame adapted to be positioned under the automobile, means for raising either or both ends of the frame and automobile as desired, and means for raising the automobile relative to the frame.

4. An automobile jack comprising a main frame adapted to be positioned under the automobile, pairs of members pivoted to the frame at different points lengthwise of the same and carrying wheels which engage the ground, and means for moving either pair of said members toward each other and toward the vertical to raise the frame and automobile.

5. An automobile jack comprising a main frame adapted to be positioned under the automobile, a plurality of pairs of members pivoted to the frame at different points lengthwise of the same and carrying wheels which engage the ground, and means for moving the members of each pair toward each other and toward the vertical to raise the frame and the automobile.

6. An automobile jack comprising a main frame adapted to be positioned under the automobile, means for raising the frame and automobile, and means for simultaneously raising one end of the automobile relative to the frame which comprises members pivoted together and engaging the automobile near their pivot points and means for moving said members toward the vertical to raise the automobile.

7. An automobile jack comprising a main frame adapted to be positioned under the automobile, means for raising the frame and automobile, and means for simultaneously raising one end of the automobile relative to the frame which comprises two U-shaped members having their free ends pivoted to gether and engaging the automobile and having their base members guided in said frame.

8. An automobile jack comprising a main frame adapted to be positioned under the automobile, a plurality of lifting members, a shaft, means for operating the same, drums loosely mounted on said shaft, means for causing the drums to turn with the shaft as desired, and means whereby the turning of each drum will operate certain of the lifting members independently of the others.

In testimony whereof, I have hereunto subscribed my name.

LAWRENCE E. BEOUGHER.